(12) United States Patent
Mikhailov et al.

(10) Patent No.: US 11,741,080 B2
(45) Date of Patent: Aug. 29, 2023

(54) DYNAMIC DATA EDITOR FOR DATA ANALYSIS SYSTEM

(71) Applicant: Flowfinity Wireless, Inc., Vancouver (CA)

(72) Inventors: Dmitry Mikhailov, Vancouver (CA); Olga Sboychakova, Vancouver (CA); Vadym Stetsiak, Vancouver (CA)

(73) Assignee: Flowfinity Wireless, Inc., Vancouver (CA)

( * ) Notice: Subject to any disclaimer, the term of this patent is extended or adjusted under 35 U.S.C. 154(b) by 679 days.

(21) Appl. No.: 15/901,995

(22) Filed: Feb. 22, 2018

(65) Prior Publication Data

US 2019/0258731 A1   Aug. 22, 2019

(51) Int. Cl.
G06F 16/23   (2019.01)

(52) U.S. Cl.
CPC ...... G06F 16/2379 (2019.01); G06F 16/2358 (2019.01)

(58) Field of Classification Search
CPC .......................... G06F 16/2379; G06F 16/2358
See application file for complete search history.

(56) References Cited

U.S. PATENT DOCUMENTS

| | | | | |
|---|---|---|---|---|
| 7,062,502 B1* | 6/2006 | Kesler | ...... | G06F 16/252 |
| 9,270,670 B1* | 2/2016 | Fitzgerald | ...... | H04L 63/08 |
| 9,489,119 B1* | 11/2016 | Smith, Jr. | ...... | G06F 40/117 |
| 2003/0005087 A1* | 1/2003 | Bernhardt | ...... | G06F 16/2465 709/220 |
| 2005/0188349 A1* | 8/2005 | Bent | ...... | G06F 8/38 717/106 |
| 2006/0271885 A1* | 11/2006 | Pittendrigh | ...... | G06F 16/2423 715/856 |
| 2007/0180386 A1* | 8/2007 | Ballard | ...... | G06F 16/9577 715/744 |
| 2009/0031230 A1* | 1/2009 | Kesler | ...... | G06F 16/252 715/764 |
| 2009/0315891 A1* | 12/2009 | Lesser | ...... | G06Q 10/04 345/440 |
| 2010/0100823 A1* | 4/2010 | Ewe | ...... | G06F 9/451 715/733 |
| 2011/0296298 A1* | 12/2011 | Ahuja | ...... | G06F 16/972 715/248 |

(Continued)

*Primary Examiner* — Brittany N Allen
(74) *Attorney, Agent, or Firm* — Mehrman Law Office; Michael J. Mehrman

(57) ABSTRACT

A data analysis system uses metadata stored in association with database records to render mirror the data collection user interfaces utilized by the data collection systems to create the data records in the database. To enable this data analysis system functionality, the data collection system stores metadata defining the data collection user interface used to create a particular data record in association with that particular data record in the database. The data analysis system can then access the metadata to render a mirror of the data collection user interface on the fly, so that an operator of the data analysis system can create a new database record or edit a preexisting data record using the same user interface that was utilized to originally create the data record. The metadata typically defines the visual aspects, data parameters, and functional aspects of the data collection user interface.

19 Claims, 5 Drawing Sheets

(56) References Cited

U.S. PATENT DOCUMENTS

| | | | | |
|---|---|---|---|---|
| 2012/0150563 A1* | 6/2012 | Carroll | ................... | G06F 19/00 705/3 |
| 2012/0166476 A1* | 6/2012 | Zaidi | ..................... | G06F 16/907 707/769 |
| 2012/0330292 A1* | 12/2012 | Shadduck | .............. | A61B 1/015 606/13 |
| 2013/0179807 A1* | 7/2013 | Day | ................... | G06F 16/2423 715/760 |
| 2014/0047413 A1* | 2/2014 | Sheive | ..................... | G06F 8/30 717/110 |
| 2014/0096014 A1* | 4/2014 | Johnson | ................. | H04L 41/22 715/733 |
| 2014/0331124 A1* | 11/2014 | Downs | ................. | G06F 40/106 715/243 |
| 2015/0169699 A1* | 6/2015 | Gilbert | ................ | G06F 3/0482 707/722 |
| 2016/0134667 A1* | 5/2016 | Suresh | ................ | G06F 3/04842 715/753 |
| 2016/0267110 A1* | 9/2016 | deValk | .................... | G06F 16/25 |
| 2017/0048319 A1* | 2/2017 | Straub | ................. | H04L 67/2847 |
| 2017/0126843 A1* | 5/2017 | Pantea | .................. | G06T 11/206 |
| 2017/0220657 A1* | 8/2017 | Nivala | .................... | G06F 16/27 |
| 2017/0315974 A1* | 11/2017 | Kong | .................... | G06F 40/171 |
| 2017/0329580 A1* | 11/2017 | Jann | ........................ | G06F 9/451 |
| 2018/0004778 A1* | 1/2018 | Roy-Faderman | ... | G06F 16/2291 |
| 2018/0052861 A1* | 2/2018 | Seetharaman | ........ | G06F 3/0428 |
| 2018/0075076 A1* | 3/2018 | Sawhney | .............. | G06F 16/219 |
| 2018/0095952 A1* | 4/2018 | Rehal | ..................... | G06F 16/213 |
| 2018/0173372 A1* | 6/2018 | Greenspan | ............ | G06N 20/00 |
| 2018/0204280 A1* | 7/2018 | Painter | .................. | G06F 16/252 |
| 2018/0330292 A1* | 11/2018 | Gundappa | .......... | G06Q 10/0633 |
| 2019/0080015 A1* | 3/2019 | Noor | .................... | G06F 16/9535 |
| 2019/0190966 A1* | 6/2019 | Décoret | ................ | H04L 65/607 |
| 2019/0205050 A1* | 7/2019 | Koorapati | ............ | G06F 16/119 |
| 2020/0210513 A1* | 7/2020 | Evans | ...................... | G06F 8/38 |

* cited by examiner

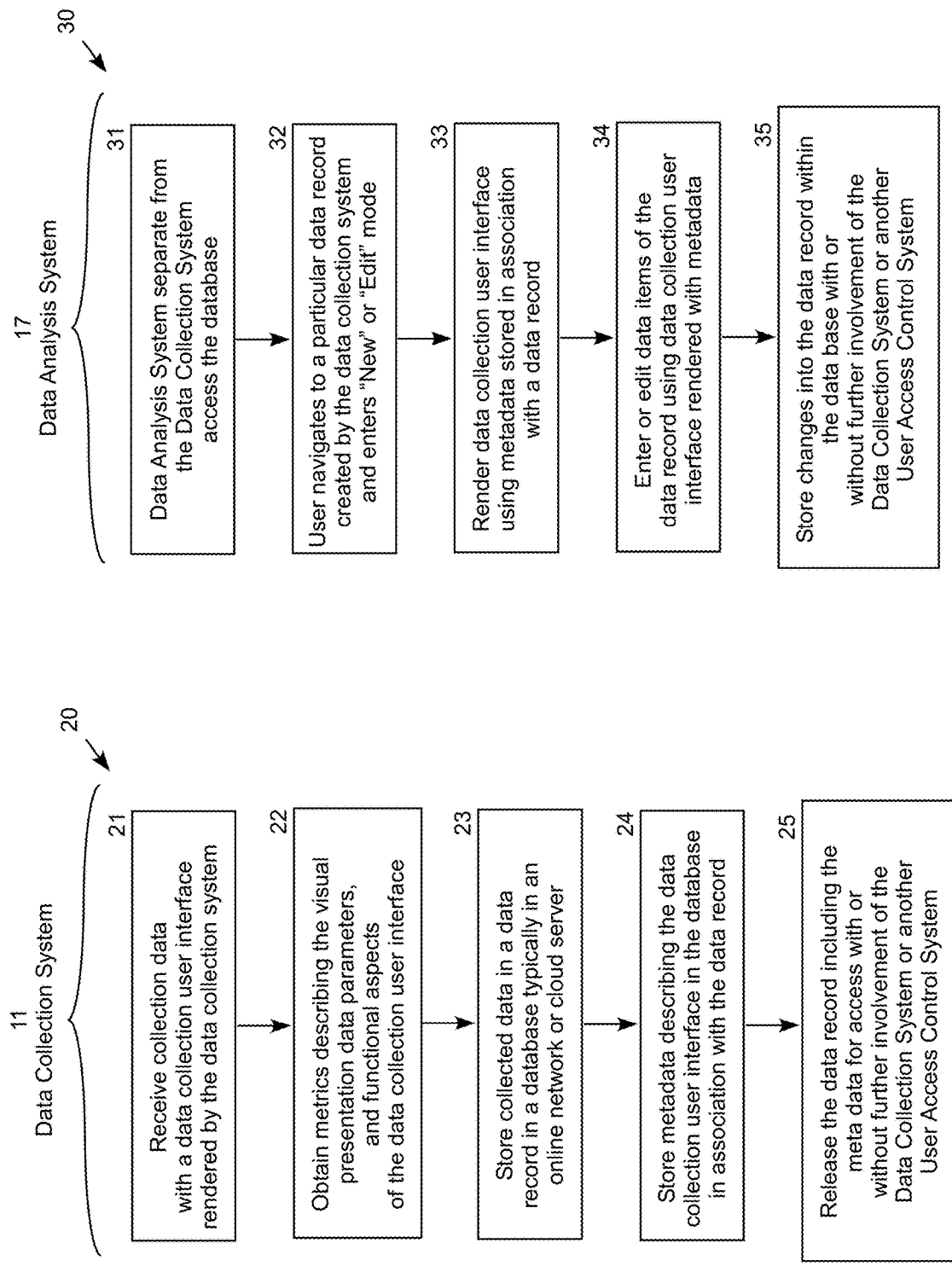

DYNAMIC DATA EDITOR FOR DATA ANALYSIS SYSTEM

TECHNICAL FIELD

The present invention relates to data analysis systems and, more particularly, to a dynamic data editor for data analysis system that automatically generate data collection user interfaces utilizing metadata stored in association with database records.

BACKGROUND

Enterprise data management systems, such as those used for inventory management and a wide range of other applications, typically utilize distinct data collection systems, database systems, and data analysis systems. In the conventional approach, a common database system is accessed by a number of separate collection and data analysis systems, which are often operated by different work groups in different physical locations. For example, a number of inventory managers working in different stores may each use their own data collection system to enter inventory records into a common online, network or cloud-based database. The data analysis system is often used by another work group, such as a management team, that utilizes a "dashboard" data viewer to review the database records created by multiple data collection work groups and conduct high level analysis, reporting and tasking. For example, the data analysis system may be used by a centralized dispatcher to manage inventory for multiple stores and schedule coordinated deliveries to the various stores.

Conventional data collection systems typically employ specialized data collection user interfaces that establish data parameters (e.g., data types and ranges), visual presentation, and functional aspects (e.g., drop-down menus, auto-fill features, pop-up instructions, etc.) for multiple data fields. Once the data fields are populated, the data is stored as a data record into database running on another computer system, such as an online, network or cloud-based system. The data collection systems may be proprietary requiring licensed access and employ highly specialized data collection user interfaces that may be difficult and time consuming to duplicate.

Conventional data analysis systems typically expose dashboard interfaces that provide insightful viewing, accumulating, analyzing and tasking actions based on data found in multiple data records in the database. However, conventional data analysis systems generally lack data input functionality required to change the data records in the database. When the user of the data analysis system identifies a database record that needs to be updated, or a new record that needs to be added, they must usually select among a few cumbersome options to update the database. In a first approach, the user contacts an authorized user of the corresponding data collection system and requests entry of a data change. This involves multiple operators in a somewhat bureaucratic process that often imposes an inconvenience and a significant delay. In a second approach, the user of the data analysis system may be authorized to launch the corresponding data collection system, either locally or through remote computer access, and enter the data change with the native data collection application. While conceptually more efficient, this approach still involves significant time to separately launch the native data collection system, requires simultaneous operation of two different computer applications, and may also require an additional license to the data collection system. In a third approach, the data analysis system may be configured with specialized programming developed and compiled into the data analysis system to enable a separate data entry facility directly from the data analysis system. This approach is both expensive and error prone because there may be different data collection systems involved that may vary in provider, version, data syntax and functionality. As a result, a separate data entry facility of this type typically requires continual maintenance at considerable expense.

There is, therefore, a continuing need for a data analysis system with improved facilities for updating database records created by separate data collection systems.

SUMMARY

The present invention solves these problems in a method, computer storage medium, or system with a dynamic data editor to perform database editing. The dynamic data editor uses metadata stored in association with database records to render data collection user interfaces that mirror the data collection user interfaces utilized by the data collection systems to create the data records in the first place. For example, a data collection system is configured to run on a first computer system, display a data collection user interface at the data collection system, and receive data items into the data collection user interface. A database is configured to run on a second computer, store the data items into a data record, and store metadata describing the data collection user interface in association the data record. A data analysis system runs on a third computer system independent of the first computer system, accesses the data record of the database, retrieves the metadata, and uses the metadata to render a mirror data collection user interface. The data analysis system then displays the mirror data collection user interface with blank data fields for creating a new database record or populated with the data items in the data record for editing the data record. The data analysis then receives one or more new or altered data items through the mirror data collection user interface and stores the altered data items into a new or existing data record of the database. As an option, the data analysis may access the metadata and implement the associated functionality without any interaction with the data collection system.

In an illustrative embodiment, the metadata describes a visual appearance, data parameters, and functional aspects of the data collection user interface. The metadata may be stored directly in the data record. Alternatively, the metadata may be stored in a storage location in the database separate from the data record, and a tag may be stored in the data record identifying the storage location. As another alternative, the metadata may be stored in a file separate from the database, and a pointer may be stored in the data record identifying the storage location.

It will be understood that additional techniques and structures for implementing particular embodiments of the invention and accomplishing the associated advantages will become apparent from the following detailed description of the embodiments and the appended drawings and claims.

BRIEF DESCRIPTION OF THE FIGURES

FIG. 2 is a logic flow diagram of a data collection system to implement its portion of the dynamic data editor.

FIG. 3 is a logic flow diagram of a data analysis system the implement its portion of the dynamic data editor.

DETAILED DESCRIPTION

Figure 1:
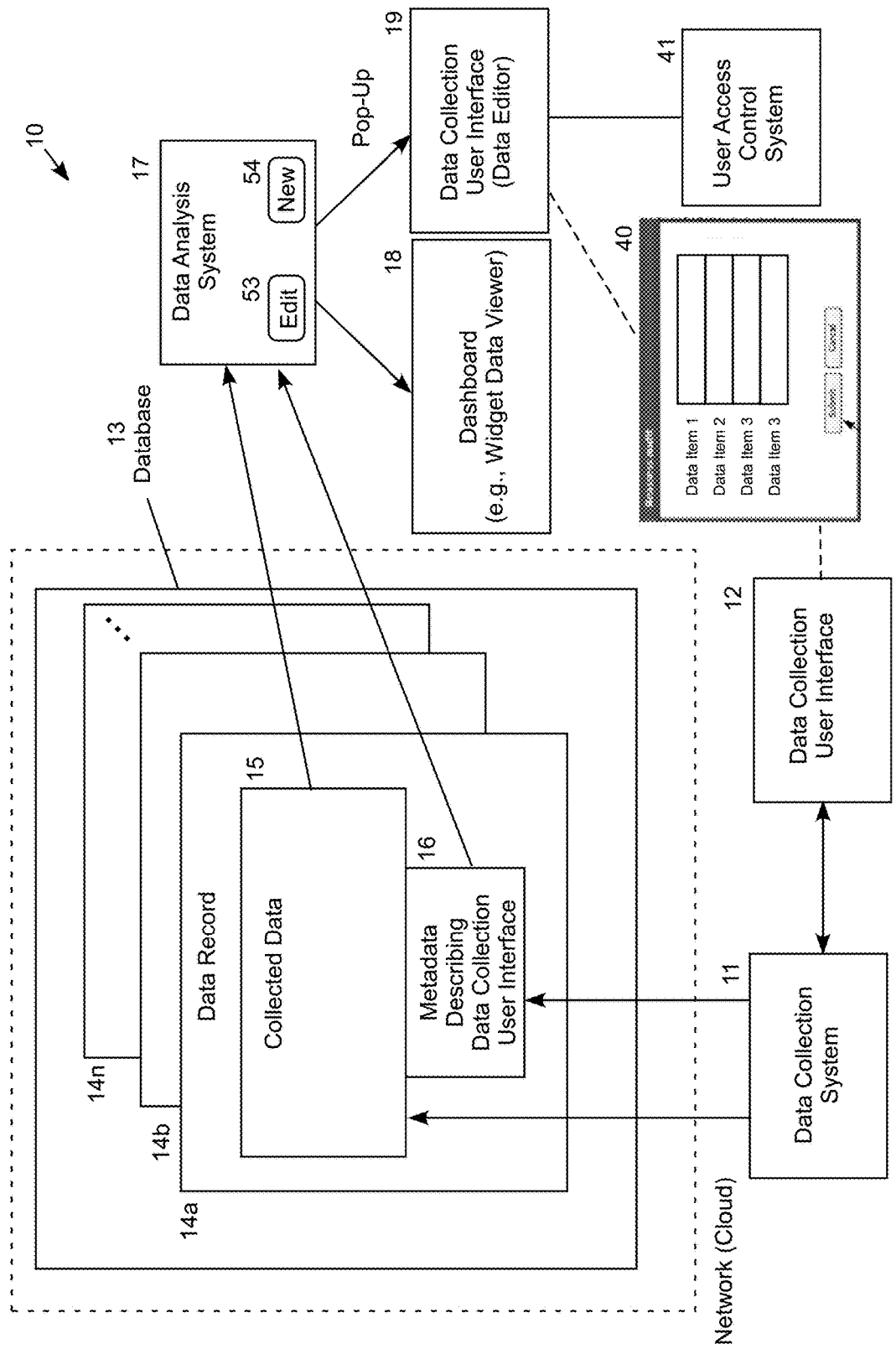
FIG. 1 is functional block diagram of a dynamic data editor for a data collection and analysis system.

This invention relates to a dynamic data editor for a data analysis system that uses metadata stored in association with database records to render data collection user interfaces that mirror the data collection user interfaces utilized by data collection systems to originally create the data records. To enable the dynamic data editor, the data collection system stores metadata defining the data collection user interface used to create a particular data record in association with that particular data record in the database and also exposes the metadata for use by the analytics system when adding new data records on the same type. The data analysis system can then access the metadata to render a mirror of the data collection user interface on the fly, so that an operator of the data analysis system can edit the data record using the same user interface that was utilized to create the data record in the first place. The metadata typically defines the visual aspects, data parameters, and functional aspects of the data collection user interface. This allows the data analysis system to render the mirror of the data collection user interface without a processing delay, without separately launching the data collection application, without requiring specialized programming, and, if desired, without requiring any real-time access to the data collection system itself.

The data analysis system may also use the metadata to implement business process rules associated with the data collection system, such as procedures allowed based on the states of records and relevant operations, and to add new data records. 40 For example, the metadata may establish access control permissions, such as user log-in, authentication, and access privilege rights, required for data input access to the database system. Access control permissions, access control settings, and business process rules may be included as part of the metadata stored in association with each database record, which allows these parameters (as well as the visual appearance, data parameters, and functional aspects of the user interfaced) to be varied on a record-by record basis.

In addition to the standard functionality of a data analysis systems, the data collection interface rendering module may therefore have the additional capability to access the data collection module metadata to get insight into which operations and states are available for database records, on a record-by-record basis, and uses this capability to present data collection user interface menu items that are specific to individual data records as well as the respective widget exposed by the data analysis system once the user reached the bottom drill down level while browsing the database with the data analysis system.

The metadata may be stored in the database itself or in a remote storage location. In that case, a call is made using a representational state transfer (REST) or another application program interface (API) to retrieve the metadata. In different embodiments, the same functionality enabled by the metadata may be accessed in different ways using one or more APIs of the data collection system to provide necessary integration link. For example, the metadata may be exposed by configuring HTTP or REST based metadata API URLs, the operations screens may be exposed via deep link URLs or other method to describe the user interface layout such as XAML, and access to the database for executing combined queries to show the real-time data in the analytical interface may be exposed via ODATA or other data access API. It should also be appreciated that the term "database" is not limited to any particular type of data storage structure, but rather encompasses any suitable non-transitory, structured, persistent, addressed storage system.

FIG. 1 is functional block diagram of a dynamic data editor 10 for a data collection and analysis system. The data collection system 11 utilizes a number of data collection user interfaces represented by the data collection user interface 12 allowing a user to enter data into a database 13 to populate a number data records 14a-14n. Each data record includes a number of fields containing collected data 15 entered with the user interface 12. The data records also include or reference metadata 16 describing the visual aspects, data parameters, and functional aspects of the data collection user interface. A particular, simplified data collection interface 40 is shown to provide an illustrative example of the functionality of the data editor. The data collection interface 40 may be displayed with the data item fields empty for creating a new record, or it may be displayed with data from an existing record for editing the existing record. The dynamic data editor 10 typically exposes an "Edit Record" button 53 that the user selects to bring up the data collection interface 40 to edit an existing database record, in addition to a "New Record" button 54 that the user selects to bring up the data collection interface to create a new database record.

A data analysis system 17, which is often operated by different work group in a different location from the data collection system 11, includes a dashboard 18 (e.g., widget data viewer) and a system of pop-up data collection user interfaces 19 that serve as data editors for the data records 14a-14n in the database 13. In general, the database 13 may be implemented in a network, online or cloud-based server, while the data collection system 11 and the data analysis system 17 operate independently to access the database on an as-needed basis. Typically, a user of the data analysis system navigates through various widget data viewers to review, analyze and create reports based on data from multiple data records. The user can generally "drill down" to a particular data record, at which point a "data editor" function can be selected. This selection causes the data analysis system to read the metadata 16 stored in or in association with the corresponding data record to render a mirror of the data collection interface 40 that was used to create the data record in the first place. This ensures that the visual presentation of the data collection interface, as well as the data types, data ranges, and functional aspects of the data collection interface are fully compatible with the database record.

The mirror of the data collection interface 40 is thus rendered on the fly by the data analysis system 17. As an option, the data collection interface may be rendered and the associated rules implemented without any real-time access to the data collection system 11, which may be offline or unavailable for any other reason. The mirror of the data collection interface 40 is also rendered without launching a separate instance of the data collection application program, without incurring a processing or network communication delay, without specialized programming incorporated into the data analysis system, and without requiring licensed access to the data collection system. In fact, no interaction is required at the time of database access between the data analysis system 17 and the data collection system 11, which may be offline, have changed to a new version, have an expired license, or even be completely unavailable at the time the data collection system accesses the database. Interaction between the Data Analysis System 11 and the Data Collection System 17 or another system, such as the user access control system 41, may be permitted or required by the mirror data collection user interfaces rendered using the metadata stored in association with database records, as desired. For example, interaction may be required for particular users, for an entire database, on a record-by-record basis, or on a function-by-function basis. These access control rules may be established at the time the metadata is stored in association with the database records and reflected in the metadata itself, or they may be reflected in a separate access control system referenced by the metadata.

FIG. 2 is a logic flow diagram 20 illustrating the procedure performed by the data collection system 11 to implement its portion of the dynamic data editor. In step 21, the data collection system receives collected data with a data collection user interface rendered by the data collection system. Step 21 is followed by step 22, in which the data collection system obtains metrics describing the visual presentation, data parameters, and functional aspects of the data collection user interface. Step 22 is followed by step 23, in which the data collection system stores the collected data in a data record of a database, typically in an online, network or cloud server. Step 23 is followed by step 24, in which the data collection system stores metadata describing the visual presentation, data parameters, and functional aspects of the data collection user interface in association with the data record. Step 24 is followed by step 25, in which the data collection system releases the data record including the corresponding metadata for access without further involvement of the data collection system.

The metadata is a self-contained instruction set sufficient to allow another application to render a fully functional mirror of the data collection user interface independent of the data collection system 11. The meta data is typically stored directly in its corresponding data record, but it may also be stored in a separate section of the database with a tag associating the metadata with its corresponding data record. Alternatively, the metadata may be stored in a separate file provided that a sufficient descriptive pointer is stored in association with the data record to match the metadata with its corresponding data record. The metadata may be per-record specific or alternatively generic describing a class of records, in which case the metadata is stored in a database location separate from the records and pointers to the metadata storage location are stored with the records.

FIG. 3 is a logic flow diagram 30 illustrating the procedure performed by the data analysis system 17 to implement its portion of the dynamic data editor. The data analysis system 17 is distinct from the data collection system 11, typically in a separate physical location and operated by a different work group. In step 31, the data analysis system accesses the database 13, which was loaded with data items by the data collection system. Step 31 is followed by step 32, in which the user of the data analysis system navigates (drills down) to a particular data record and enters into an "edit record" mode to edit an existing data record. The user may also enter into a "new record" mode using the buttons or links exposed by the data analysis system to create a new data record." Step 32 is followed by step 33, in which the data analysis system accesses the metadata associated with a data record and uses the metadata to render a mirror of the data collection user interface originally used to enter data into the data record. In the "new" record mode, the data analysis system accesses the metadata associated with a data record of the same type to render a new data collection interface without data entries. In the "edit" record mode, the data analysis system accesses the metadata associated with a particular selected data record to render the data collection interface used to create the selected record displaying the data entries currently in the record. The metadata may also be used to determine the current state of the record in the business process and present relevant editing actions to the user according to metadata define permissions for the user. The data collection user interface also loads the data collection user interface with the data items present in the data record. Step 33 is followed by step 34, in which the data analysis system receives changes to the data items in the data record through the data collection user interface rendered by the data analysis system using the metadata. Step 34 is followed by step 35, in which the data analysis system stores the changes to data items of the data record into the database 13 without interaction with the data collection system 11. As an option, the data analysis system may interact with the data collection system to any desired extent in connection with the operation of the data collection user interface rendered by the data analysis system.

Figure 4:
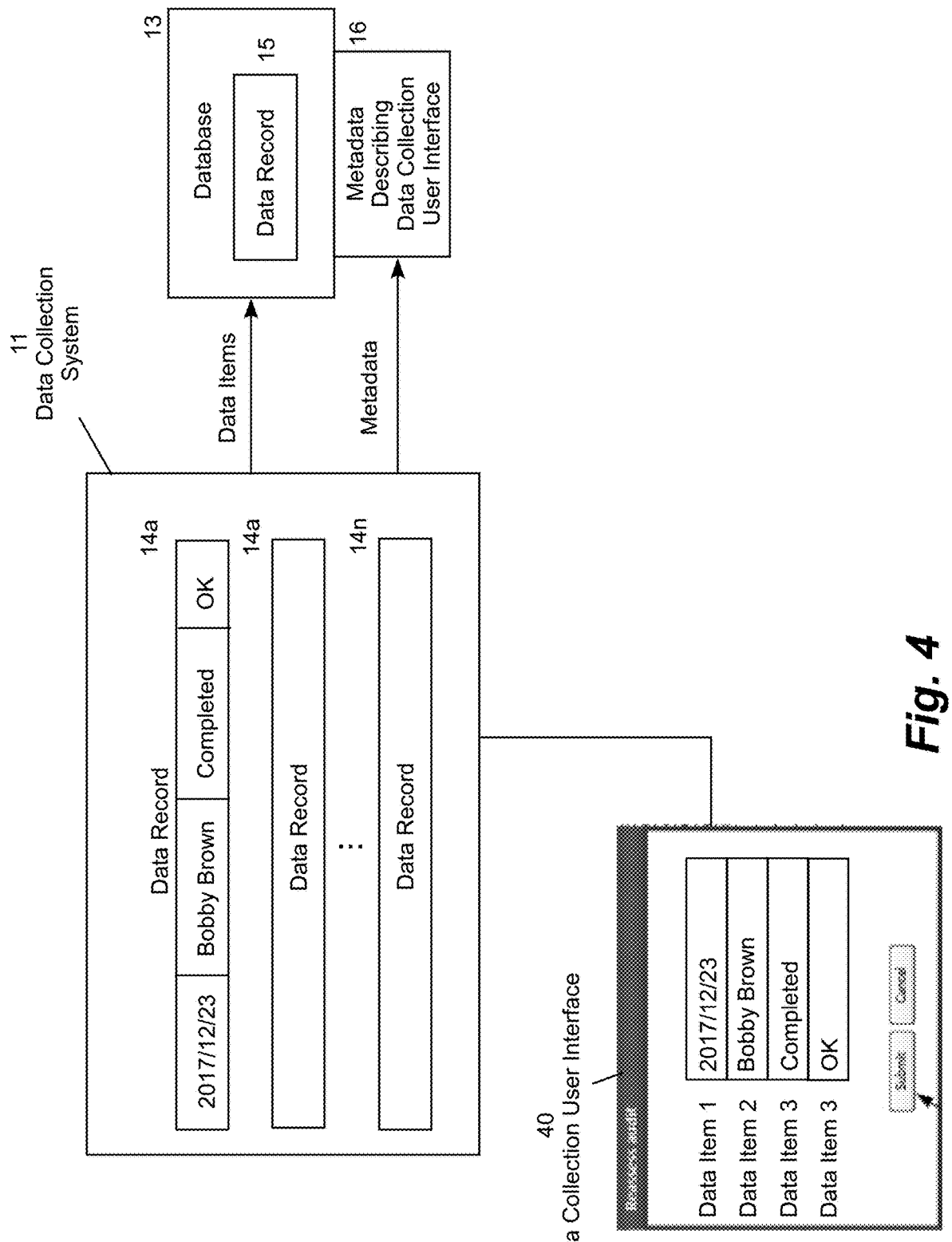
FIG. 4 is a functional block diagram of representative elements of the data collection system for implementing its portion of the dynamic data editor.

To provide a simplified illustration of the data management process, FIG. 4 is a functional block diagram showing the data collection system 11 displaying several records 14a-n of an inventory management system. A user of the data collection system 11 utilizes the data collection user interface 40 rendered by the data collection system to enter the data items "2017/12/23"; "Bobby Brown"; "Completed" and "OK" into the data record 14a. The data collection user interface 40 has a particular visual appearance, only accepts certain data values within certain data ranges into the various data fields, and may have a range of functional features, such as drop-down menus, pop-up instructions, auto-fill features, and so forth. Once the user is satisfied with the data entry, the "submit" button is used to post the data items into a data record in the database 13, while also saving metadata describing the data collection user interface 40 to a location within or referenced by the data record database. The metadata is associated with its corresponding data record in any suitable way, for example by storing the metadata or a tag or pointer to the metadata in the data record itself.

Figure 5:
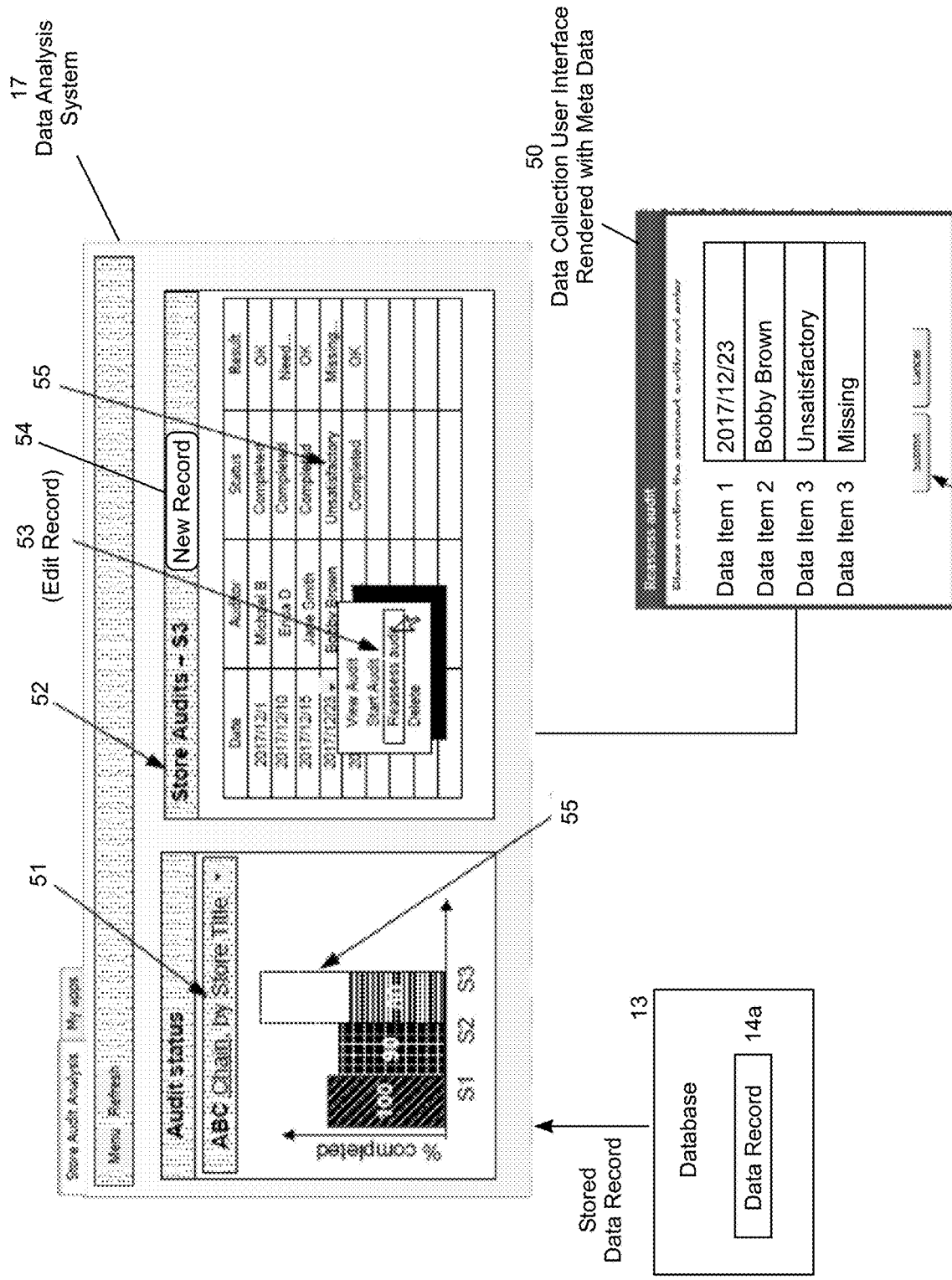
FIG. 5 is a functional block diagram of representative elements of the data analysis system for implementing its portion of the dynamic data editor prior to updating a data record.

FIG. 5 is a functional block diagram illustrating representative elements of the data analysis system 17 for implementing its portion of the dynamic data editor prior to updating a data record. In this example, the user of the data analysis system navigates (drills down) through active graphical items 51-55 (including an "edit record" button 53 and a "new record" button 54) to locate a data record for updating, such as an incomplete record, a corrupted record, a record with questionable data, a record selected for auditing, a record flagged in another process, or the like. The user selects a particular data record and enters a "data edit" mode. In response, the data analysis system accesses the metadata associated with the selected data record and renders a mirror user interface 50 corresponding to the data collection user interface 40 originally used to enter the data items into the data record, including the data items current present in the data record in the database 13. In this case, two of the data items show up as "unsatisfactory" and "missing."

Figure 6:
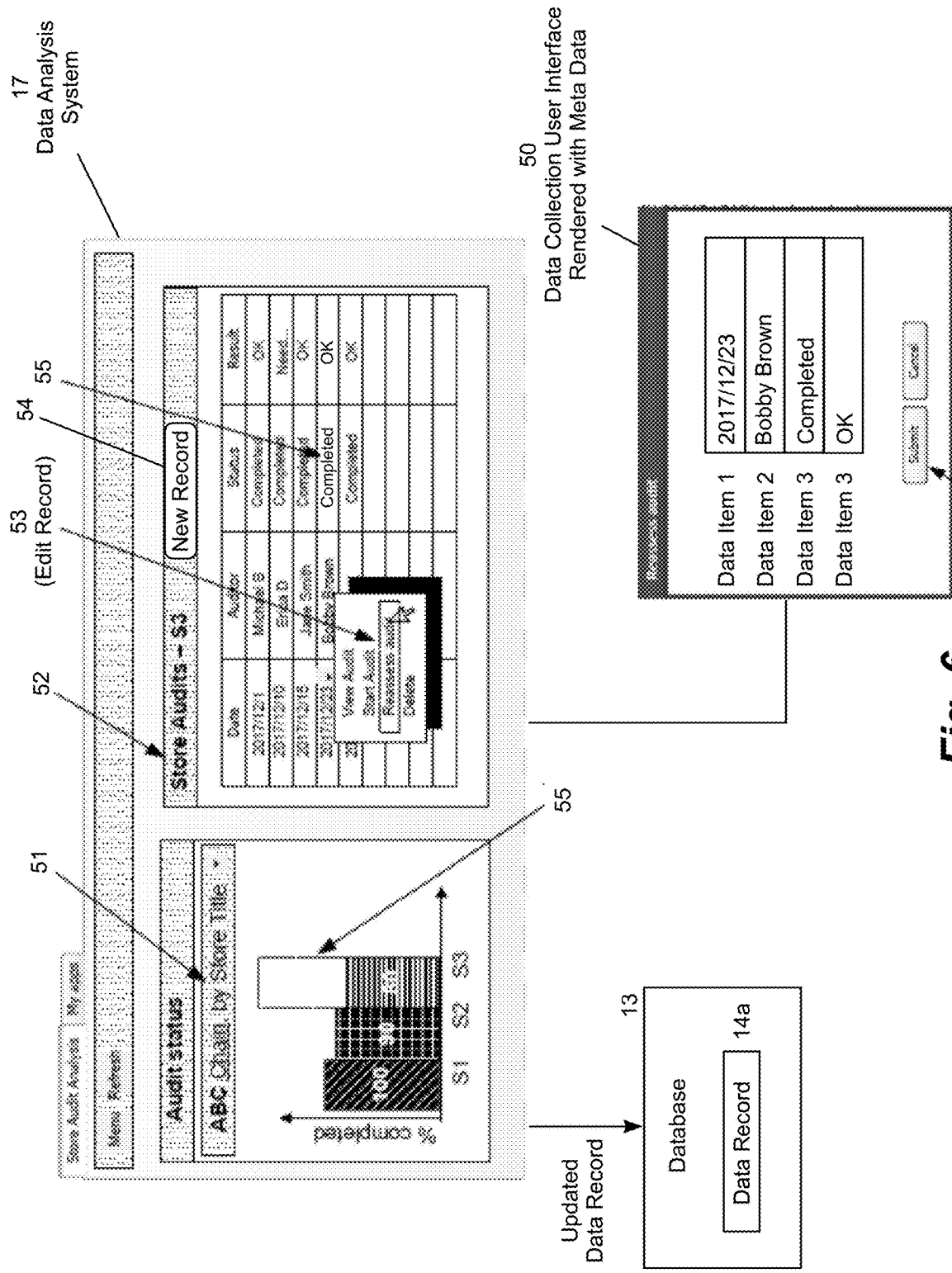
FIG. 6 is a functional block diagram of representative elements of the data analysis system for implementing its portion of the dynamic data editor after updating a data record.

As shown in FIG. 6, the user uses the mirror user interface 50 to update the data record in this example by entering "Completed" for the data item identifies as "unsatisfactory," and "OK" for the data item identified as "missing." The data analysis system 17 then stores the updated data record into the database 13 without accessing or interacting with the data collection system 11.

It will be appreciated that the invention may be used for a wide range of data analysis systems. The representative inventory management example is provided as an illustrative embodiment without limiting the scope and applicability of the invention. The present disclosure is particularly well suited to implementation on portable computing devices, which may communicate with a server system providing access to a number of client systems over a network, or as a dedicated computing system. As such, embodiments of the disclosure may comprise adapting or reconfiguring presently existing equipment. Alternatively, original equipment may be provided embodying the disclosure.

All of the methods described in this disclosure may include storing results of one or more steps of the method embodiments in a non-transient storage medium. The results may include any of the results described in this disclosure and may be stored in any manner known in the art. The storage medium may include any storage medium described in this disclosure or any other suitable storage medium known in the art. After the results have been stored, the results can be accessed in the storage medium and used by any of the method or system embodiments described in this disclosure, formatted for display to a user, used by another software module, method, or system, etc. Furthermore, the results may be stored permanently, semi-permanently, temporarily, or for some period of time. For example, the storage medium may be random access memory (RAM), and the results may not necessarily persist indefinitely in the storage medium.

Those having skill in the art will appreciate that there are various vehicles by which processes and/or systems and/or other technologies described in this disclosure can be implemented (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described in this disclosure may be implemented, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that various implementations may employ any suitable type of hardware, software, and/or firmware.

Those skilled in the art will recognize that it is common within the art to describe devices and/or processes in the fashion set forth in this disclosure, and then use engineering practices to integrate such described devices and/or processes into data processing systems. That is, at least a portion of the devices and/or processes described can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems. All of the technology described in this disclosure is suitable for implementation using commercially available computing devices, such as network servers operated by the situational awareness system and smartphones or personal computers operated by members and customers. These computing devices may be interconnected via the Internet, mobile telephone voice and data system, or other data suitable network.

This disclosure sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components may be combined to achieve a particular functionality can be seen as "associated with" each other such that the desired functionality is achieved, irrespective of architectures or intermediate components. Likewise, any two components so associated can also be viewed as being "connected", or "coupled", to each other to achieve the desired functionality, and any two components capable of being so associated can also be viewed as being "functionally connected" to each other to achieve the desired functionality. Specific examples of functional connection include but are not limited to physical connections and/or physically interacting components and/or wirelessly communicating and/or wirelessly interacting components and/or logically interacting and/or logically interacting components.

While particular aspects of the present subject matter have been shown and described in detail, it will be apparent to those skilled in the art that, based upon the teachings of this disclosure, changes and modifications may be made without departing from the subject matter described in this disclosure and its broader aspects and, therefore, the appended claims are to encompass within their scope all such changes and modifications as are within the true spirit and scope of the subject matter described in this disclosure. Although particular embodiments of this disclosure have been illustrated, it is apparent that various modifications and embodiments of the disclosure may be made by those skilled in the art without departing from the scope and spirit of the disclosure. Accordingly, the scope of the disclosure should be limited only by the claims appended hereto.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. The disclosure is defined by the following claims, which should be construed to encompass one or more structures or function of one or more of the illustrative embodiments described above, equivalents and obvious variations.

The invention claimed is:

1. A method for dynamic database editing, comprising:
   running a data collection system on a first computer system, displaying a data collection user interface at the data collection system, and receiving data items into the data collection user interface;
   storing the data items into a data record of a database running on a second computer system, and storing metadata describing the data collection user interface in association with the data record in the second system;
   running a data analysis system on a third computer system independent of the first computer system, analyzing multiple records of the database, navigating to the data record residing on the second system with the data analysis system, accessing the data record residing on the second system with the data analysis system, retrieving the metadata for the data record from the second system and rendering a mirror data collection user interface for the data record based on the metadata, and displaying the mirror data collection user interface for the data record with data fields for creating a new database record or populated with the data items in the data record copied from the data record residing on the second system for editing the data record;
   at the data analysis system, receiving one or more new or altered data items for the data record through the mirror data collection user interface, and storing the new or altered data items into a new or preexisting data record of the database residing on the second computer system; and
   further comprising retrieving the metadata without interacting with the data collection system or launching an instance of the data collection system.

2. The method of claim 1, wherein the metadata describes a visual appearance, data parameters, and functional aspects of the data collection user interface.

3. The method of claim 1, further comprising storing the metadata in the data record.

4. The method of claim 1, further comprising storing the metadata in a storage location in the database separate from the data record, and storing a tag in the data record identifying the storage location.

5. The method of claim 1, further comprising storing the metadata in a file separate from the database, and storing a pointer in the data record identifying the storage location.

6. A plurality of non-transitory computer storage media storing instructions executable by multiple computers to cause the computers to perform a method for dynamic database editing, comprising:
   running a data collection system on a first computer system, displaying a data collection user interface at the data collection system, and receiving data items into the data collection user interface;
   storing the data items into a data record of a database running on a second computer system, and storing metadata describing the data collection user interface in association with the data record in the second system;
   running a data analysis system on a third computer system independent of the first computer system, analyzing multiple records of the database, navigating to the data record residing on the second system with the data analysis system, accessing the data record residing on the second system with the data analysis system, retrieving the metadata for the data record from the second system and rendering a mirror data collection user interface for the data record based on the metadata, and displaying the mirror data collection user interface for the data record with data fields for creating a new database record or populated with the data items in the data record copied from the data record residing on the second system for editing the data record;
   at the data analysis system, receiving one or more new or altered data items for the data record through the mirror data collection user interface, and storing the new or altered data items into a new or preexisting data record of the database residing on the second computer system; and
   further comprising retrieving the metadata without interacting with the data collection system or launching an instance of the data collection system.

7. The non-transitory computer storage media of claim 6, wherein the metadata describes a visual appearance, data parameters, and functional aspects of the data collection user interface.

8. The non-transitory computer storage media of claim 6, further comprising storing the metadata in the data record.

9. The non-transitory computer storage media of claim 6, further comprising storing the metadata in a storage location in the database separate from the data record, and storing a tag in the data record identifying the storage location.

10. The non-transitory computer storage media of claim 6, further comprising storing the metadata in a file separate from the database, and storing a pointer in the data record identifying the storage location.

11. A system configured to perform dynamic database editing, comprising:
    a data collection system configured to run on a first computer system, display a data collection user interface at the data collection system, and receive data items into the data collection user interface;
    a database configured to run on a second computer, store the data items into a data record, and store metadata describing the data collection user interface in association with the data record;
    a data analysis system configured to run on a third computer system independent of the first computer system, access the data record of the database with the data analysis system, retrieve the metadata for the data record, render a mirror data collection user interface for the data record based on the metadata, and display the mirror data collection user interface for the data record with data fields for creating a new database record or populated with the data items in the data record copied from the data record residing on the second system for editing the data record;
    wherein the data analysis system is further configured to receive one or more new or altered data items for the data record through the mirror data collection user interface, and store the new or altered data items into a new or preexisting data record of the database residing on the second computer system;
    further comprising retrieving the metadata without interacting with the data collection system or launching an instance of the data collection system.

12. The system of claim 11, further comprising a user access control system accessed by the data analysis system in connection with the operation of the mirror data collection user interface.

13. The system of claim 11, wherein the metadata describes a visual appearance, data parameters, and functional aspects of the data collection user interface.

14. The system of claim 11, further comprising storing the metadata in the data record.

15. The system of claim 11, further comprising storing the metadata in a storage location in the database separate from the data record, and storing a tag in the data record identifying the storage location.

16. The system of claim 11, further comprising storing the metadata in a file separate from the database, and storing a pointer in the data record identifying the storage location.

17. The method of claim 1, further comprising: displaying a graphical user interface for the data collection system on a display screen of the third computer system; displaying the mirror data collection user interface for the data record within a pop-up window displayed over a portion of the graphical user interface for the data collection system on the display screen of the third computer system.

18. The non-transitory computer storage media of claim 6, further comprising displaying the one or more new or altered data items within the mirror data collection user interface displayed within the pop-up window over the portion of the graphical user interface for the data collection system on the display screen of the third computer system.

19. The system of claim 11, further comprising displaying the one or more new or altered data items within the mirror data collection user interface displayed within the pop-up window over the portion of the graphical user interface for the data collection system on the display screen of the third computer system.

* * * * *